United States Patent
Franzini et al.

(10) Patent No.: US 9,661,384 B1
(45) Date of Patent: May 23, 2017

(54) TRICK PLAY USER ACTIVITY RECONSTRUCTION

(71) Applicant: ARRIS Enterprises LLC, Suwanee, GA (US)

(72) Inventors: Simone Franzini, Chicago, IL (US); Loren J. Rittle, Lake Zurich, IL (US); Douglas A. Kuhlman, Inverness, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/091,238

(22) Filed: Apr. 5, 2016

(51) Int. Cl.
*H04H 60/32* (2008.01)
*H04N 21/442* (2011.01)
*H04N 21/433* (2011.01)
*H04N 21/466* (2011.01)
*H04N 21/81* (2011.01)

(52) U.S. Cl.
CPC ..... *H04N 21/44222* (2013.01); *H04N 21/433* (2013.01); *H04N 21/44204* (2013.01); *H04N 21/4667* (2013.01); *H04N 21/812* (2013.01)

(58) Field of Classification Search
CPC . H04N 21/433; H04N 21/4667; H04N 21/812
See application file for complete search history.

(56) References Cited

U.S. PATENT DOCUMENTS

| | | |
|---|---|---|
| 7,248,777 B2 | 7/2007 | Feininger et al. |
| 8,238,727 B2 | 8/2012 | Wright |
| 8,370,586 B2 | 2/2013 | Whisnant et al. |
| 8,682,816 B2 | 3/2014 | Ruhl et al. |
| 8,989,554 B2 | 3/2015 | Feininger et al. |
| 2003/0154128 A1 | 8/2003 | Liga et al. |
| 2008/0109298 A1* | 5/2008 | Barton .......... G06Q 30/02 705/7.32 |
| 2014/0032506 A1 | 1/2014 | Hoey et al. |

* cited by examiner

*Primary Examiner* — Hunter B Lonsberry
(74) *Attorney, Agent, or Firm* — Stewart M. Wiener

(57) ABSTRACT

A system and method for reconstructing trick play user activity are provided and include analyzing playback information of a recorded program during a playback session to identify trick play actions believed to occur during the playback session. The playback information includes a first sequence of separate video offset events associated with different points of time during the playback session at spaced intervals. For each adjacent pair of video offset events separated by one of the spaced intervals, a change of video offset is compared relative to a change of time to determine a type of trick play action occurring between the adjacent pair of video offset events. A sequence of trick play actions is reconstructed from the trick play actions identified. The method may include analyzing additional playback information and merging such information with the reconstructed sequence of trick play actions to further refine the reconstructed sequence.

20 Claims, 10 Drawing Sheets

| TIMESTAMP (SECONDS) | 120 | 125 | 130 | 135 | 140 | 145 | 150 | 155 | 160 | 165 |
|---|---|---|---|---|---|---|---|---|---|---|
| VIDEO OFFSET (SECONDS) | 0 | 5 | 10 | 15 | 20 | 25 | 30 | 35 | 20 | 5 |

FIG. 2

| TIMESTAMP (SECONDS) | | 125 | | 135 | | | 150 | 155 | 160 | 165 |
|---|---|---|---|---|---|---|---|---|---|---|
| VIDEO OFFSET (SECONDS) | | 5 | | 15 | | | 30 | 35 | 20 | 5 |

FIG. 3

| TIMESTAMP (SECONDS) | 120 | | 130 | | 140 | 145 | | | | |
|---|---|---|---|---|---|---|---|---|---|---|
| VIDEO OFFSET (SECONDS) | 0 | | 10 | | 20 | 25 | | | | |

FIG. 4

1. Sort input sequence S by increasing timestamp } 56
2. Initialize E=[], prev = $s_1$ } 58
3. For each input event $s_i$ from $s_2$ to $s_N$ If $((t_i - t_{i-1}) > L)$ AND (E.isEmpty OR $t_{i-1}$ != E.last.$t_{end}$ ) then E.add((FACT, $t_{i-1}$, $o_{i-1}$, $t_{i-1}$, $o_{i-1}$)) else:

1. Compute the progress ratio p = $(o_i - o_{i-1}) / (t_i - t_{i-1})$

2. For each progress ratio action range $[r_{min}, r_{max}]$

1. If $(r_{min} < p <= r_{max})$

1. If (E.isempty || E.last.action != action) then E.add((action, $t_{i-1}$, $o_{i-1}$, $t_i$, $o_i$)) else E.last.tend = $t_i$, E.last.$o_{end}$ = $o_i$ 3. prev = $s_i$ } 64

FIG. 6

1. Reconstruct sequence for time step j-1, yielding $E_{j-1}$
2. Reconstruct sequence for time step j, yielding $E_j$   } 86
3. E' = merge sort $E_j$ with $E_{j-1}$   } 88
4. Initialize E'' = first tuple in E'   } 90
5. For each tuple $e_i$ in E' from $e_2$ to $e_M$ If (($e_i.t_{start}$ - E''.last.$t_{end}$) > L + epsilon) then E''.add($e_i$) else:   } 92

1. Calculate progress ratios: $p_{prev}$ = progress(E''.last), $p_{prev,cur}$ = progress(E''.last, $e_i$), $p_{cur}$ = progress($e_i$)   } 94

2. If (E''.last.action==FACT AND $e_i$.action==FACT) then merge(fact, fact)
  Else if (E''.last.action==FACT AND $e_i$.action!=FACT) then merge(fact, action)
  Else if (E''.last.action!=FACT AND $e_i$.action==FACT) then merge(action, fact)
  Else if (E''.last.action!=FACT AND $e_i$.action!=FACT) then merge(action, action)   } 96

FIG. 8

- Merge(fact1, fact2):

100 — 1. A = getAction($p_{prev,cur}$)                                              // Determine new action 102 — 2. E''.add((A, fact1.$t_{end}$, fact1.$o_{end}$, fact2.$t_{start}$, fact2.$o_{start}$))    // Add new action

FIG. 9

- Merge(fact, action):

1. If (|$p_{prev}$ - $p_{prev,cur}$| < epsilon) then    // If progress ratios are compatible 1. E''.add((action.value, fact.$t_{start}$, fact.$o_{start}$, action.$t_{end}$, action.$o_{end}$))

2. Else

1. E''.remove(E''.last)                                                // Remove the fact 2. A = getAction($p_{prev,cur}$)                                       // Determine new boundary action 3. E''.add((A, fact.$t_{end}$, fact.$o_{end}$, action.$t_{start}$, action.$o_{start}$))    // Add the new action 4. E''.add(action)                                                     // Also add the current action

FIG. 10

- Merge(action, fact):

1. If ($|p_{prev} - p_{prev,cur}| <$ epsilon) then       // If progress ratios are compatible 1. $E''$.remove($E''$.last)       // Remove existing action 2. $E''$.add((action.value, action.$t_{start}$, action.$o_{start}$, fact.$t_{end}$, fact.$o_{end}$))       // Add the new action   ⎫ 112

2. Else

1. A = getAction($p_{prev,cur}$)       // Determine new boundary action

2. $E''$.add((A, action.$t_{end}$, action.$o_{end}$, fact.$t_{start}$, fact.$o_{start}$))       // Add the new action   ⎫ 114

Merge(a1, a2):

1. If (a1.value==a2.value AND ((|$p_{prev} - p_{prev,cur}$| < epsilon) OR (|$p_{prev,cur}$| < epsilon |))) then  ⎫ 118
   1. E″.remove(E″.last)
   2. E″.add((a1.value, a1.$t_{start}$, a1.$o_{start}$, a2.$t_{end}$, a2.$o_{end}$)) ⎭

2. Else if (|$p_{prev} - p_{prev,cur}$| < epsilon)    // a1.value != a2.value, boundary action == a1.value  ⎫ 120
   1. E″.remove(E″.last)
   2. E″.add((a1.value, a1.$t_{start}$, a1.$o_{start}$, a2.$t_{start}$, a2.$o_{start}$))
   3. E″.add(a2) ⎭

3. Else if (|$p_{cur} - p_{prev,cur}$| < epsilon)    // a1.value != a2.value , boundary action == a2.value  ⎫ 122
   1. E″.add((a2.value, a1.$t_{end}$, a1.$o_{end}$, a2.$t_{end}$, a2.$o_{end}$)) ⎭

4. Else    // Boundary action != a1.value, a2.value  ⎫ 124
   1. A = getAction($p_{prev,cur}$)
   2. E″.add((A, a1.$t_{end}$, a1.$o_{end}$, a2.$t_{start}$, a2.$o_{start}$))
   3. E″.add(a2) ⎭

FIG. 12

TRICK PLAY USER ACTIVITY RECONSTRUCTION

BACKGROUND

Advertisers, television networks, content providers and like entities often benefit from analytics concerning the size, demographic composition, and the like of a viewing audience that consumes audio, video and like programs. For example, information concerning the total time a particular viewer or set of viewers watched a program or watched an advertisement within a program are often desired.

The above referenced analytics can be difficult to ascertain for recorded programs viewed at later unspecified times by viewers. For example, digital video recorders (DVR), personal video recorders (PVR), set top boxes (STB), computers, smartphones, and like devices and equipment that may be located at the consumer's site permit audio and video content to be downloaded, streamed, recorded, or the like and then replayed at a later time in accordance with the desires of the consumer. Recording devices also include network digital video recorders (nDVR), network personal video recorders (nPVR), remote storage digital video recorder (rs-DVR), and like equipment that are network-based digital video recorders that may be stored or located on the cloud at a server location or at a content provider's location rather than at the consumer's private location or home.

The above referenced devices have effectively increased the consumer's ability to time shift the consumption of programs (i.e., to record, download, or stream a program and ultimately consume the program or parts thereof at a later time that best suits the consumer). This ability to time shift has also provided the consumer with enhanced power to consume only selected portions of programs by, for example, skipping or fast-forwarding through portions of recorded content, and also to consume parts of a program multiple times via use of rewinding or the like.

For purposes of tracking the total minutes or time that a recorded or stored program was watched or that advertisements within such a program were watched, it is necessary to determine which sections of the program were viewed during a play or playback action as compared to other so-called trick play actions, such as fast-forward, rewind, and pause.

BRIEF DESCRIPTION OF THE DRAWINGS

Various features of the embodiments described in the following detailed description can be more fully appreciated when considered with reference to the accompanying figures, wherein the same numbers refer to the same elements.

FIG. 2 is a representation of a sequence of time-stamped, video-offset events of an example in accordance to an embodiment.

FIG. 3 is a representation of a sequence of time-stamped, video-offset events of an example in accordance to an embodiment.

FIG. 4 is a representation of a sequence of time-stamped, video-offset events of an example in accordance to an embodiment.

FIG. 6 is an example of pseudo-code for analyzing a sequence of timestamped, video-offset events in accordance to an embodiment.

FIG. 8 is an example of pseudo-code for merging separate output sequences of video-offset events in accordance to an embodiment.

FIG. 9 is an example of pseudo-code for merging a pair of facts included in separate output sequences of video-offset events in accordance to an embodiment.

FIG. 10 is an example of pseudo-code for merging a previous fact with a current action included in separate output sequences of video-offset events in accordance to an embodiment.

FIG. 11 is an example of pseudo-code for merging a previous action with a current fact included in separate output sequences of video-offset events in accordance to an embodiment.

FIG. 12 is an example of pseudo-code for merging a pair of actions included in separate output sequences of video-offset events in accordance to an embodiment.

DETAILED DESCRIPTION

Figure 1:
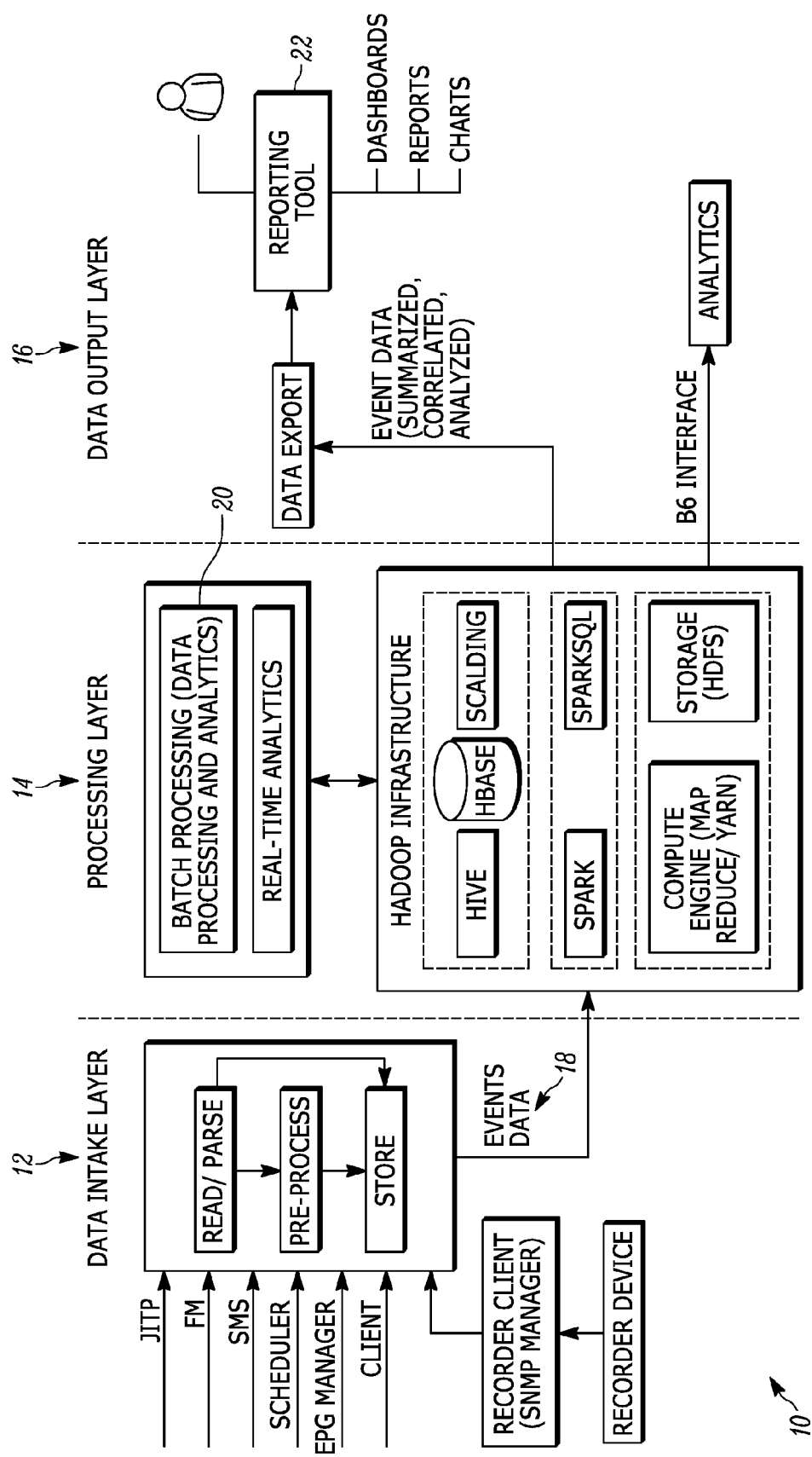
FIG. 1 is a schematic diagram of system for producing analytics in accordance to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Embodiments described herein disclose systems and methods that utilize information concerning trick play events or actions (play, pause, fast forward, and rewind) to estimate the total time a consumer may have actually consumed a recorded audio/video program and/or advertisements within the program during a play or playback action. The term "rewind" is used herein to correspond to any action which causes relocation from a current playback location within a program to an earlier portion of the program, and the term "fast forward" is used herein to correspond to any action which causes relocation from a current playback location within a program to a later portion of a program.

Trick play event information in most systems concerning playback of recorded programs is typically not known, tracked, available, collected, or recorded on a continuous or continual basis. In accordance to embodiments disclosed herein, information concerning the state of trick play action during a playback session is available only in a form of a sequence of separate, spaced-apart individual events or data points provided only at set intervals during playback. For example, such information may only be available as a sequence of separate time-stamped video offset events or the like in which the events are provided at fixed intervals. Thus, according to embodiments disclosed herein, the sequence of separate video offset events are used to piece together and reconstruct trick play user activity so that the parts of the program and/or advertisements that may have been viewed during a play or playback mode of operation by the consumer can be distinguished from other parts of the program that may have been skipped.

In addition and to further compound the problem, information corresponding to some of the video offset events may be received out of order, may be missing, and/or may never actually be received. Further, since reconstruction and like data processing may be triggered or preset to be accomplished at a certain time or at certain times during the day or like time period by a particular system, it is possible that not all video offset events may be received relative to a consumer playback or viewing session before a first or subsequent reconstructions are attempted and that additional events may be received after first or subsequent reconstructions have occurred.

According to some embodiments, consumer playback information relative to playback by a particular consumer of a particular recorded program during a playback session is collected and/or received as a sequence of time-stamped video offset events and analyzed for purposes of at least partially reconstructing and estimating the original or actual sequence of trick play events. When additional playback information is received, collected, and made available only after an attempt or attempts at reconstruction is made, the additional information is analyzed and merged with a previous attempt at reconstruction to increase the completeness and refine a previous reconstruction. Such a refinement always adds information to a reconstruction. Once an action is represented in the reconstruction, it will not be invalidated during a refinement. However, the action may be extended in time, if compatible additional playback information is received and considered during a refinement.

Solely for purposes of example, a system 10 for generating a reconstruction of trick play actions is shown in FIG. 1. The system 10 may include a data intake layer 12, a processing layer 14, and a data output layer 16 for analytics generated for a cloud-based network digital video recorder (nDVR).

Electronic messages may be automatically generated concerning the status of playback (i.e., video offset information) of a program recorded on the nDVR and may be periodically received (such as every few seconds or like time interval) and collected by the data intake layer 12 which may also receive other information concerning the client, electric programming guide, scheduler, and the like. The electronic messages may include information of time-stamped video offset events and this "events data" 18 may be provided to the processing layer 14. Such information may be stored and merged and subject to batch processing in module 20 to produce the desired analytics.

The event data having been analyzed, correlated and summarized may be exported to the data output layer 16 for use by a reporting tool 22 or the like for the preparation of analytical reports, charts, and the like. Of course, FIG. 1 represents merely one example for handling the flow and data processing of trick play event information and embodiments discussed below are not limited thereto.

According to some embodiments, the messages or inputs of trick play information are provided as a series or sequence of separate data points, elements or pairs. For instance, each data element may include a timestamp (t) or like value representing or related to the time that the data point was recorded relative to real time or the like. Each data element may also include video offset information (o) representing a time within the program, for instance, relative to the start of the program (i.e., the start of the program may be set to the time 00:00:00). Thus, each data element or point may be represented as (t, o).

An input sequence (S) of a predetermined number (N) of such data elements may be provided in the form of: $(t_1, o_1)$, $(t_2, o_2)$, ..., $(t_N, O_N)$.

In some cases as will be discussed below, the input may include some pre-processed or combined trick play information in the form of a finite ordered list of elements, such as a so-called tuple, over a course of one or more data elements or points. For instance, the input may be in the form of: (Action/Fact, $t_{start}$, $o_{start}$, $t_{end}$, $o_{end}$) that defines the trick play action (Play, Pause, Fast Forward, or Rewind) or Fact (i.e., an isolated data point from which the trick play action cannot be determined from available information) and the start timestamp ($t_{start}$) and the end timestamp ($t_{end}$) and the start video offset ($o_{start}$) and the end video offset ($o_{end}$) of the action or fact between and across one or more data elements. Accordingly, these types of inputs may be provided to the batch processing module 20 shown in FIG. 1.

From this input information, the batch processing module 20 shown in FIG. 1 may produce an output provided, for instance, as a sequence (E) of tuples each provided in the form of (Action/Fact, $t_{start}$, $o_{start}$, $t_{end}$, $o_{end}$) that defines the trick play action (play, pause, fast forward, rewind) or fact (i.e., an isolated data point from which the trick play action cannot be determined based on available information) and the start timestamp and the end timestamp and start video offset and end video offset of the action or fact relative to one or more data elements. In this way, the various data points are combined and summarized in an attempt to reconstruct the actual series or sequence of actions believed to have been taken by the consumer as the consumer watched the recorded program or parts thereof during a playback session.

In the above example, a type of trick play action may be determined from data elements or points based on the change in video offset values defined with the program relative to timestamp values between a series of two or more adjacent data points. For example, during a "play" trick play action, the change of video offset values relative to the change of timestamp values between an adjacent pair of data points should be about the same or at a predetermined ratio. Conversely, during a "rewind" type of action, the video offset values should actually decrease or move in an opposite direction relative to the timestamp values, and during a "fast forward" action, the change of the video offset values should be greater than the rate at which the timestamp values change over the same set of data points. A "pause" trick play action may produce a video offset value that stays the same over a period of timestamps.

According to some embodiments, a progress ratio (p) is defined as the change of offset values divided by the change of timestamp values over an adjacent pair of data points. This may be represented by the following formula: $p=(o_i-o_{i-1})/(t_i-t_{i-1})$. The value of "p" may be used to determine if the action between the data points corresponds to a play, rewind, fast forward, or pause trick play action. For instance: if $p<-0.2$, then the trick play action may be estimated to be a "rewind" action; if $-0.2 \leq p<0.2$, then the action may be estimated to be a "pause" action; if $0.2 \leq p<1.2$, then the action may be estimated to be a "play" action; and if $p \geq 1.2$, then the action may be estimated to be a "fast forward" action. Of course, these values are provided by way of example only and may be defined based on expected values.

Embodiments of methods used to reconstruct user trick play activity are provided below by way of the examples. As a first example, FIG. 2 provides a sequence 24 of separate data points for analysis and from which user trick play activity is to be reconstructed. In this example, the timestamps are provided in seconds from 120 to 165 seconds, and the interval (L) or elapsed time between data points or events is known, fixed, and constant at five seconds. Thus, the sequence of timestamps includes individual data points having the values of 120, 125, 130, 135, 140, 145, 150, 155, 160 and 165 seconds.

A video offset value is provided for each timestamp shown in FIG. 2. For example, at the timestamp of 120 seconds, the video offset is 0 seconds (which may correspond to a starting point of the program or a section within the program). At the timestamp of 125 seconds, the video offset is 5 seconds into the program. Thus, it is clear that both the timestamp and video offset increased by 5 seconds between these two data points reflecting a "play" action (i.e., p=1.0). This play action remains the same through the timestamp of 155 seconds (i.e., p=1.0 throughout this time period). Accordingly, this may be represented by the output: (Play, 120, 0, 155, 35).

In FIG. 2, the video offset value decreases from 35 seconds at the 155 second timestamp to 20 seconds at the 160 second timestamp and to 5 seconds at the 165 second timestamp (i.e., p=−3 over this period). Thus, a "rewind" trick play action is occurring in the 155 to 165 second timestamp period. Accordingly, this may be represented by the output: (Rewind, 155, 35, 165, 5).

In the example provided by FIG. 2, this represents the original sequence with all data points received in order and with no data points missing. However, as discussed above, it is more likely that only certain data points will be received before reconstruction is attempted and that some of the data points will be missing. For instance, refer to the information or input sequence 26 provided by the data points shown in FIG. 3 which corresponds to the exact data points in FIG. 2, but with several data points missing at the time of analysis and reconstruction.

Accordingly, FIG. 3 represents a "time step 1" in which only timestamps corresponding to 125, 135, 150, 155, 160 and 165 seconds are received before analysis and attempted reconstruction of trick play actions. It is known in this example that the expected interval of timestamps is five seconds and thus that timestamps corresponding to 120, 130, 140 and 145 seconds are missing. The output produced by the information shown in FIG. 3 would produce two "facts" since insufficient data is available to determine the action at the 125 second timestamp and 135 second timestamp (i.e., adjacent data points at the known spaced interval (L) are missing). Thus, this produces the following output: (Fact, 125, 5, 125, 5) and (Fact, 135, 15, 135, 15).

In addition, a play action (i.e., p=1) can be determined between the 150 and 155 second timestamps of FIG. 3 and a rewind action (i.e. p=−3) can be determined between the 155 and 165 second timestamps. Thus, these may be output as: (Play, 150, 30, 155, 35) and (Rewind, 155, 35, 165, 5). Accordingly, in "time step 1" only some of the trick play actions may be reconstructed because not all the data points are available at the time of analysis. Thus, only a partial reconstruction is possible. A partial reconstruction is always implied herein even if only the word reconstruction is used.

FIG. 4 represents a "time step 2" of an input sequence 28 in which the missing data points from FIG. 3 are later received. Based on a similar analysis as described above, the output from "time step 2" is: (Fact, 120, 0, 120, 0), (Fact, 130, 10, 130, 10), and (Play, 140, 20, 145, 25).

Accordingly, Table 1 provided below shows a step of updating and merging the sequences of events that were analyzed from the data points shown in FIGS. 3 and 4. The output sequence generated at "time step 1" is referenced as step "j−1" and the output sequence generated at "time step 2" is referenced as step "j". The output sequences generated in these separate steps may be organized, sorted or arranged by increasing timestamp values as shown in Table 1.

TABLE 1

| OUTPUT SEQUENCES | STEP |
|---|---|
| (Fact, 120, 0, 120, 0) | j |
| (Fact, 125, 5, 125, 5) | j-1 |
| (Fact, 130, 10, 130, 10) | j |
| (Fact, 135, 15, 135, 15) | j-1 |
| (Play, 140, 20, 145, 25) | j |
| (Play, 150, 30, 155, 35) | j-1 |
| (Rewind, 155, 35, 165, 5) | j-1 |

Upon further analysis and merger of the information shown in TABLE 1, the output resulting from the merger produces: (Play, 120, 0, 155, 35) and (Rewind, 155, 35, 165, 5). Here, a comparison of the relative values of video offset and timestamps can be used to determine the type of trick play action occurring between each adjacent pair of data elements. In some instances, this may cause two or more facts to be combined into a single action, may cause a fact to be combined into an existing defined action, may cause a pair of actions to be merged into a single action, or may cause a new action to be identified between two pre-defined actions. Thus, from this information, analytics can be generated. For instance, the program and/or advertisement were watched corresponding to video offset marker 0 seconds to 35 seconds.

Figure 5:
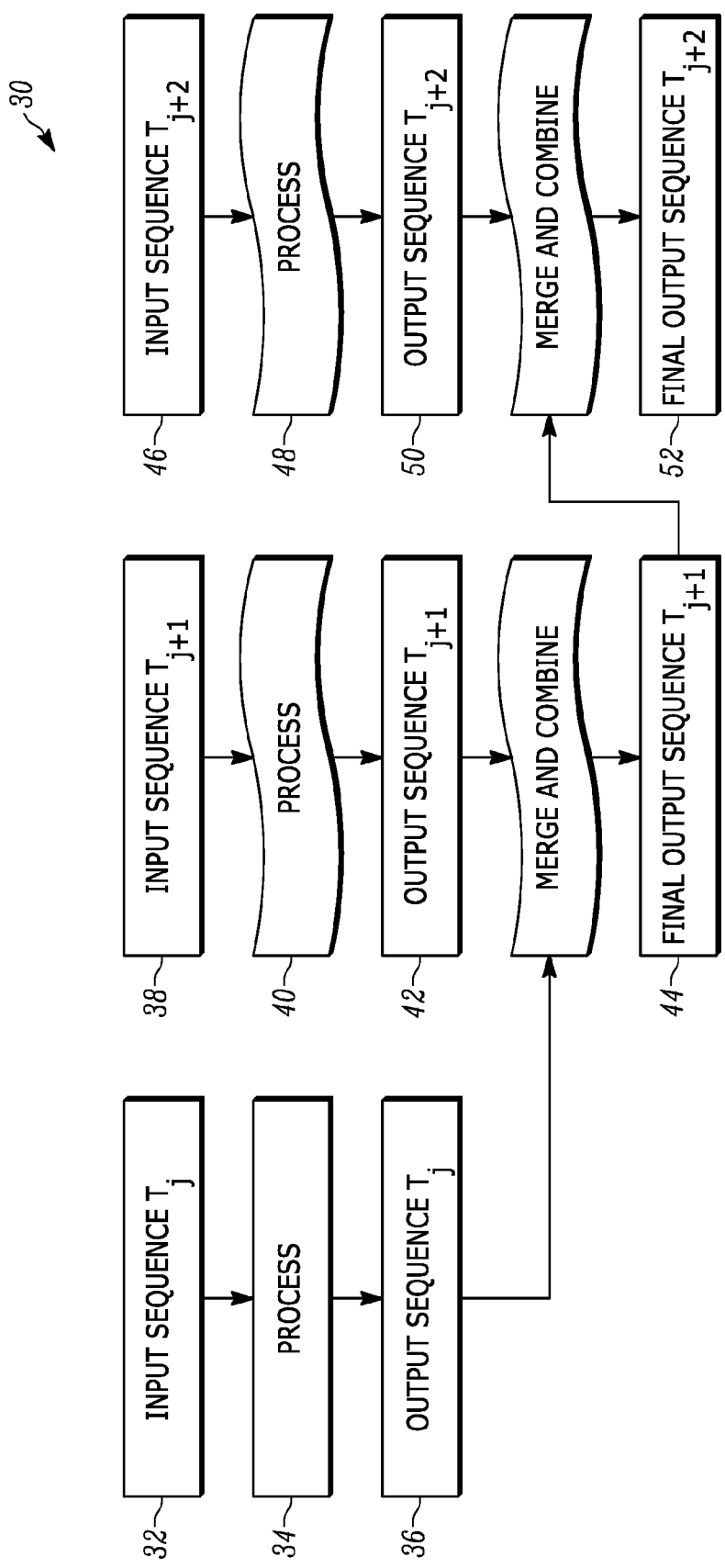
FIG. 5 is flowchart of a method reconstructing user trick play activity in accordance to an embodiment.

The flow and series of steps taken during a reconstruction process 30 is shown in FIG. 5. A first input sequence ($T_j$) of events 32 is received and the events are analyzed in process 34 as discussed above to produce a first output sequence 36 which may define Facts as discussed above or periods of time over which a particular Action is determined as discussed above. Thereafter, a second input sequence ($T_{j+1}$) of events 38 is received and the events are analyzed in process 40 as discussed above to produce a second output sequence 42 which may define Facts or periods of time over which a particular Action is determined. The first and second output sequences, 36 and 42, are then merged as discussed above to produce a final output sequence of events 44.

Thereafter, a third input sequence ($T_{j+2}$) of events 46 is received and the events are analyzed in process 48 to produce a third output sequence 50 which may define Facts or periods of time over which a particular Action is determined. The first final output sequence 44 and the third output sequence 50 are then merged to produce a second final output sequence of events 52. This process may be continued for as many input sequences as received relative to a given playback session.

An example of pseudo code 54 for reconstructing trick play action sequence for a one-time step (i.e., for any one of the boxes labeled "process" in FIG. 5) is provided in FIG. 6. The timestamps are provided at a fixed, defined, event interval (L). The input sequence (S) is first sorted according to increasing timestamp value in step 56. This is because the input events may not necessarily be received in any specific order and may be received in a random order. Initialization of the output sequence (E) and assignment of the first input data set ($s_1$) in the input Sequence (S) is assigned a definition of "previous" in step 58. Thus, the subsequent analysis starts with the second input data set $s_2$.

For each input event $s_1$ from $s_2$ to $s_N$ of the input sequence (S), the interval between adjacent timestamps, as sorted relative to increasing timestamp value, is determined and compared relative to the known, fixed interval (L) in step 60. If the input event is not adjacent to any other input event (i.e., there is no input event at the previous or next interval), then a fact is generated. Alternatively, the progress p is computed in step 62 and compared to ranges ($r_{min}$ and/or $r_{max}$) to determine the appropriate type of trick play action and an action output sequence (e) is generated. Thereafter, the current input event ($s_i$) is set to "previous" in step 64 and the process iteratively continues until a set of output sequences (E) are generated as discussed above.

Figure 7:
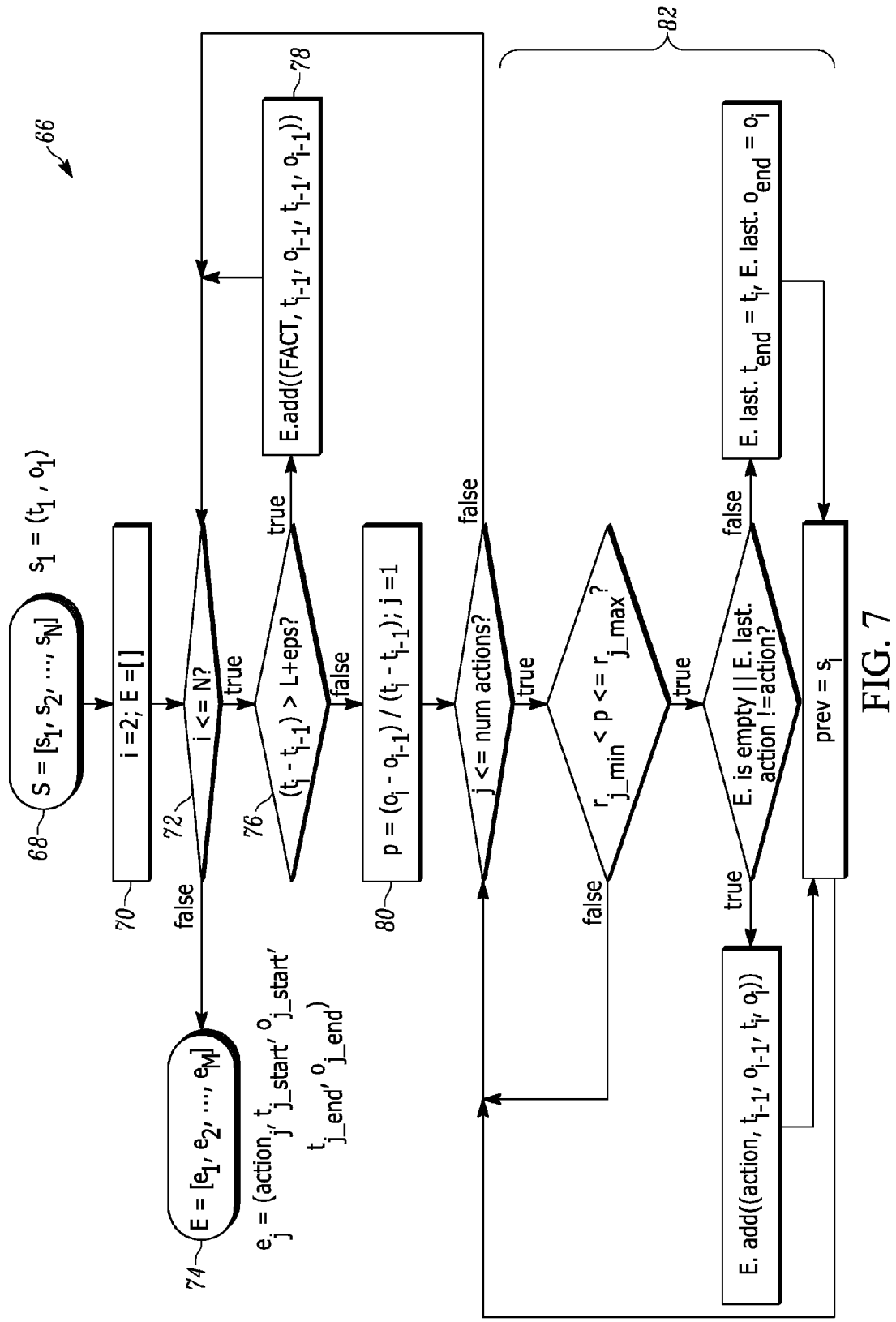
FIG. 7 is flowchart of a method of analyzing a sequence of timestamped, video-offset events in accordance to an embodiment.

FIG. 7 also a flowchart 66 that illustrates that above discussed process. In FIG. 7, the input sequence (S) is sorted in step 68, and the value of "i" and "E" are initialized in step 70. If the input event is greater than "N" (i.e., the total number of input events) in step 72, then the process ends in step 74 with an output sequence (E) including tuples $e_1$ to $e_M$. However, if the input event is less than or equal to "N", than the process proceeds to step 76 to determine if the current input event is the next input event relative to the defined previous input event, or if there may be a missing input event in the input sequence. If a missing input event is determined, a fact is created in step 78 and the value of "i" is incremented. If not, the value of progress ratio (p) is calculated in step 80 and an action is subsequently determined in steps 82 as discussed above. These calculations continue until all input events have been analyzed and a final output sequence (E) has been generated in step 74.

An example of pseudo code 84 for merging separately determined output sequences (i.e., for any one of the boxes labeled "merge and combine" in FIG. 5) in which the timestamps are provided at a fixed event interval (L) is provided in FIG. 8. The sequences are constructed for $E_{j-1}$ and $E_j$ as discussed above in steps 86 and the defined facts and actions are sorted by increasing timestamps in step 88 to produce sequence E'. The first action or fact defined in E' is set to previous and E" is initiated in step 90. If the current action or fact is not within the interval (plus epsilon) of the previous action or fact, then no change is made according to step 92. However, if these are spaced apart by the defined interval, the progress ratio (p) is calculated for any previous action, any current action, and between the boundaries of previous and current actions or facts in step 94. Thereafter, in step 96, one of a fact-fact merger, a fact-action merger, an action-fact merger, or an action-action merger is performed.

An example of pseudo code 98 for merging two separate adjacent facts is shown in FIG. 9. The progress ratio (p) calculated between the previous fact and the current fact is used in step 100 to determine the type of action and a new action is generated in step 102. By way of example, if the Facts include: (Fact 5, 20, 5, 20) and (Fact, 10, 25, 10, 25), then the merger yields output sequence (Play, 5, 20, 10, 25). Thus, the new action is determined, in this case "Play", and the tuple is created as shown above.

An example of pseudo code 104 for merging a separate previous Fact with an adjacent separate current Action is shown in FIG. 10. If the progress ratios are consistent between the fact and the first data point in the current action and the current action, then the previous fact is added into the current action in step 106. Alternatively, if the progress ratios are not consistent and indicate different trick play actions, then a new action is generated preceding the current action in steps 108. For instance, if the separate previous Fact and current Action include: (Fact 5, 20, 5, 20) and (Play, 10, 25, 20, 35), then the merger yields output sequence (Play, 5, 20, 20, 35) in step 106. However, as another example, if the separate previous Fact and current Action include: (Fact 5, 20, 5, 20) and (Fast Forward, 10, 25, 20, 55), then the merger yields output sequence (Play, 5, 20, 10, 25) and (Fast Forward, 10, 25, 20, 55) in steps 108.

An example of pseudo code 110 for merging a separate previous Action with a separate current Fact is shown in FIG. 11. If the progress ratios are consistent between the previous action and the last data point in the previous action and the fact in the current action, then the current fact is added into the previous action in step 112. Alternatively, if the progress ratios are not consistent and indicate different trick play actions, then a new action is generated following the previous action in step 114. For instance, if the separate Action and Fact include: (Play 5, 20, 10, 25) and (Fact, 15, 30, 15, 30), then the merger yields output sequence (Play, 5, 20, 15, 30) in step 112. As another example, if the separate Action and Fact include: (Play 5, 20, 10, 25) and (Fact, 15, 40, 15, 40), then the merger yields output sequence (Play, 5, 20, 10, 25) and (Fast Forward, 10, 25, 15, 40) in step 114.

An example of pseudo code 116 for merging a separate previous Action with a separate current Action is shown in FIG. 12. If the progress ratios are consistent between the previous action and the current action, then the previous and current actions are merged in step 118. Alternatively, if the progress ratios of the previous action and the current action are not consistent and indicate different trick play actions, then one of the following steps is taken. If the progress ratio calculated between the facing boundaries of the actions is consistent with the progress ratio of the previous action, then the boundary of the previous action is advanced forward to the boundary of the current action in step 120. In contrast, if the progress ratio calculated between the facing boundaries of the actions is consistent with the progress ratio of the current action, then the boundary of the current action is extended rearward to the boundary of the previous action in step 122. Finally, if the progress ratio calculated between the facing boundaries of the actions is inconsistent with the progress ratios of both the current action and the previous action, then a new action is generated between the previous and current actions in step 124.

By way of example, if the separate Actions include: (Play 5, 20, 10, 25) and (Play, 15, 30, 20, 35), then the merger yields output sequence (Play, 5, 20, 15, 30) in step 120. As another example, if the separate Actions include: (Fast Forward, 5, 5, 15, 45) and (Play 20, 65, 30, 75), then the merger yields output sequence (Fast Forward, 5, 5, 20, 65) and (Play, 20, 65, 30, 75) in step 124. As a further example, if the separate Actions include: (Fast Forward, 5, 5, 20, 65) and (Play 25, 70, 30, 75), then the merger yields output sequence (Fast Forward, 5, 5, 20, 65) and (Play, 20, 65, 30, 75) in step 126. As a still further example, if the separate Actions include: (Play 20, 65, 30, 75) and (Play, 35, 60, 45, 70), then the merger yields output sequence: (Play, 20, 65, 30, 75), (Rewind, 30, 75, 35, 60), and (Play, 35, 60, 45, 70) in step 126.

In some embodiments, input messages may not be provided at a nominal event interval (L) and thus may not be sent at fixed intervals (i.e., intervals between data points may vary). However, in this case, provided sequence numbers are included in the input events (i.e., 0001, 0002, 0003, . . . ), then construction can be based on the sequence numbers (i.e., the determination of adjacent data points is based on the value of sequence numbers). Here, missed input events are determined by gaps in sequence numbers, not a comparison of the gap between two timestamps and the known value (L) of a fixed interval as discussed above. Also the determination of type of trick play action may be based solely on the change of video offset value (i.e., no change equates to "pauses", reduction in value equates to "rewind", increase at a predefined rate equates to "play", and an increase above a predefined rate equates to "fast forward").

If input events do not include sequence numbers and if the input events are not transmitted at a fixed interval (L), then actions may be determined based on each adjacent pair of input events (i.e., it is assumed that there are no missing input data points). The accuracy of such a reconstruction may be improved when missing events are later received, analyzed and then merged and combined with the previous reconstruction as discussed above.

Accordingly, given the above examples and explanations, an embodiment may be provided by a computer-implemented method for reconstructing trick play user activity. The method may include executing on a processor the step of analyzing playback information of a recorded program during a playback session to identify trick play actions occurring during the playback session. The playback information may include a first sequence of separate video offset events. The separate video offset events may be associated with different points of time during the playback session at spaced intervals. For each adjacent pair of video offset events separated by one of the spaced intervals, a change of video offset is compared relative to a change of time to determine a type of trick play action occurring between the adjacent pair of video offset events. Thereafter, a sequence of trick play actions occurring during the playback session may be reconstructed from the trick play actions identified during the above referenced analysis. The method may also include storing the reconstructed sequence of trick play actions along with at least a subset of playback information which was unable to be incorporated into trick play actions identified by said analyzing step.

Each of the spaced intervals between the different points of time may correspond to an equal, fixed, and constant amount of time, and the trick play actions that are identifiable may be selected from the group of play, pause, fast forward, and rewind actions. Each of the video offset events may be provided in a form of a time-stamped video offset event including a timestamp value and a video offset value.

If the change of video offset values is substantially equivalent to the change of timestamp values between adjacent time-stamped video offset events sorted by timestamp value and separated only by the spaced interval, then a play trick play action is identified between the adjacent time-stamped video offset events. If the change of video offset values is greater than the change of timestamp values between adjacent time-stamped video offset events sorted by timestamp value and separated only by the spaced interval, then a fast forward trick play action is identified between the adjacent time-stamped video offset events. If the change of video offset values is in an opposite direction to the change of timestamp values between adjacent time-stamped video offset events sorted by timestamp value and separated only by the spaced interval, then a rewind trick play action is identified between the adjacent time-stamped video offset events, and if the change of video offset values is substantially zero as compared to the change of timestamp values between adjacent time-stamped video offset events sorted by timestamp value and separated only by the spaced interval, then a pause trick play action is identified between the adjacent time-stamped video offset events. If adjacent time-stamped video offset events as arranged by timestamp value are separated by greater than the spaced interval, then no trick play action is identified between the adjacent time-stamped video offset events.

The method may include a step of generating a total time during which a play trick play action was in effect during the playback session of the recorded program or may include a step of generating a total time during which a play trick play action was in effect during the playback session corresponding to playback of an advertisement provided within the recorded program. Further, the method may include a step of receiving the first sequence of video offset events as a first set of separate electronic messages concerning the playback information of the recorded program during the playback session.

The method may also include a step of separately analyzing a second sequence of video offset events occurring at different points of time during the playback session. The second sequence of video offset events includes video offset events at points of time different than that of the first sequence of video offset events. Accordingly, the method may also include the step of merging video offset information provided by the second set of video offset events with the sequence of trick play actions identified during the above referenced reconstructing step for purposes of producing a further refined and reconstructed sequence of trick play actions.

The merging step may include combining an individual video offset event (i.e., fact) that is unable to be identified as part of a trick play action during any previous analyzing step with a trick play action previously identified by one of the analyzing steps. The individual video offset event is combined with the previously identified trick play action when a change of video offset relative to a change of time between the individual video offset event and an adjacent video offset event within the previously identified trick play action is consistent with that for the previously identified trick play. Alternatively, a new trick play action may be defined between the individual video offset event and the adjacent video offset event within the previously identified trick play action.

The merging step may include combining a first trick play action identified during the analyzing step of the first sequence of video offset events with a second trick play action identified during the analyzing step of the second sequence of video offset events. Here, the first and second trick play actions may be combined when a change of video offset relative to a change of time between video offset events forming boundaries of the first and second trick play actions that are separated in time only by the spaced interval are consistent with that for each of the first and second trick play actions. Alternatively, when a change of video offset relative to a change of time between video offset events forming boundaries of the first and second trick play actions that are separated in time only by the spaced interval are consistent with only one of the first and second trick play actions, then the boundary of the matching trick play action is extended to the boundary of the non-matching trick play action.

The merging step may also include identification of an intermediate trick play action occurring between a first trick play action and a second trick play action. For instance, the intermediate trick play action is identified when a change of video offset relative to a change of time between adjacent boundaries of the first and second trick play actions separated in time only by the spaced interval are not consistent with that for either of the first and second trick play actions.

Finally, the method may include further analyzing steps for each new sequence of video offset events received after a previous merging step, and a new merging step may be performed after each new analyzing step to further refine the reconstructed sequence of trick play actions.

A system for carrying out the above methods may include software or the like provided on a circuit board or within another electronic device and can include various processors, microprocessors, controllers, chips, disk drives, and the like. It will be apparent to one of ordinary skill in the art that systems, modules, processors, servers, and the like may be implemented as electronic components, software, hardware or a combination of hardware and software for purposes of providing a system.

An embodiment may also include at least one non-transitory computer readable storage medium having computer program instructions stored thereon that, when executed by at least one processor, can cause the at least one processor to perform any of the steps described above.

While the principles of the invention have been described above in connection with specific devices, apparatus, systems, algorithms, booking agents, and/or methods, it is to be clearly understood that this description is made only by way of example and not as limitation. One of ordinary skill in the art will appreciate that various modifications and changes can be made without departing from the scope of the claims below.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A computer-implemented method for reconstructing trick play user activity, comprising executing on a processor the steps of:
analyzing playback information of a recorded program during a playback session to identify trick play actions occurring during the playback session, the playback information including a first sequence of separate video offset events, the separate video offset events being associated with different points of time during the playback session at spaced intervals;
during said analyzing step, for each adjacent pair of video offset events separated by one of the spaced intervals, a change of video offset is compared relative to a change of time to determine a type of trick play action occurring between the adjacent pair of video offset events;
reconstructing a sequence of trick play actions occurring during the playback session from the trick play actions identified by said analyzing step; and
storing the reconstructed sequence of trick play actions along with at least a subset of playback information unable to be incorporated into trick play actions identified by said analyzing step.

2. The computer-implemented method according to claim 1, wherein the subset of playback information includes individual video offset events which were unable to be incorporated into trick play actions during said analyzing and reconstructing steps.

3. The computer-implemented method according to claim 1, wherein, during said storing step, the subset of playback information is stored interleaved with the reconstructed sequence of trick play actions as standalone facts.

4. The computer-implemented method according to claim 1, wherein each of the spaced intervals between the different points of time corresponds to an equal and fixed amount of time, wherein the trick play actions identifiable by said analyzing step include play, pause, fast forward, and rewind actions, and wherein each of the video offset events is provided in a form of a time-stamped video offset event including a timestamp value and a video offset value.

5. The computer-implemented method according to claim 4, wherein if the change of video offset values is substantially equivalent to the change of timestamp values between adjacent time-stamped video offset events sorted by timestamp value and separated only by the spaced interval, then a play trick play action is identified between the adjacent time-stamped video offset events.

6. The computer-implemented method according to claim 4, wherein if the change of video offset values is greater than the change of timestamp values between adjacent time-stamped video offset events sorted by timestamp value and separated only by the spaced interval, then a fast forward trick play action is identified between the adjacent time-stamped video offset events.

7. The computer-implemented method according to claim 4, wherein if the change of video offset values is in an opposite direction to the change of timestamp values between adjacent time-stamped video offset events sorted by timestamp value and separated only by the spaced interval, then a rewind trick play action is identified between the adjacent time-stamped video offset events, and wherein if the change of video offset values is substantially zero as compared to the change of timestamp values between adjacent time-stamped video offset events sorted by timestamp value and separated only by the spaced interval, then a pause trick play action is identified between the adjacent time-stamped video offset events.

8. The computer-implemented method according to claim 4, wherein, if adjacent time-stamped video offset events as arranged by timestamp value are separated by greater than the spaced interval, then no trick play action is identified between the adjacent time-stamped video offset events, and wherein if an individual time-stamped video offset event is separated by greater than the spaced interval to any adjacent time-stamped video event as arranged by timestamp value, then the individual time-stamped video offset event is included in the subset of playback information unable to be incorporated into trick play actions.

9. The computer-implemented method according to claim 1, further comprising executing on a processor at least one of the steps of generating a total time during which a play trick play action was in effect during the playback session of the recorded program and generating a total time during which a play trick play action was in effect during the playback session corresponding to playback of an advertisement provided within the recorded program.

10. The computer-implemented method according to claim 1, further comprising executing on a processor the steps of:
   after said reconstructing and storing steps, analyzing a second sequence of video offset events occurring at different points of time during the playback session, the second sequence of video offset events including video offset events at points of time different than that of the first sequence of video offset events; and
   merging video offset information provided by the second set of video offset events with the sequence of trick play actions identified during said reconstructing step to produce a further refined and reconstructed sequence of trick play actions.

11. The computer-implemented method according to claim 10, wherein said merging step includes combining an individual video offset event that is unable to be identified as part of a trick play action during either of said analyzing steps with a trick play action previously identified during one of said analyzing steps, said individual video offset event is combined with the previously identified trick play action when a change of video offset relative to a change of time between the individual video offset event and an adjacent video offset event within the previously identified trick play action is consistent with that for the previously identified trick play action.

12. The computer-implemented method according to claim 10, wherein said merging step includes adding a new trick play action between an individual video offset event that was unable to be identified as part of a trick play action during either of said analyzing steps and an adjacent boundary of a trick play action previously identified during one of said analyzing steps, said new trick play action is added when a change of video offset relative to a change of time between the individual video offset event and an adjacent video offset event within the previously identified trick play action is inconsistent with that for the previously identified trick play action.

13. The computer-implemented method according to claim 10, wherein said merging step includes combining a first trick play action identified during said analyzing step of the first sequence of video offset events with a second trick play action identified during said analyzing step of the second sequence of video offset events, said first and second trick play actions are combined when a change of video offset relative to a change of time between video offset events forming boundaries of the first and second trick play actions that are separated in time only by the spaced interval are consistent with that for each of the first and second trick play actions.

14. The computer-implemented method according to claim 10, wherein said merging step includes extending a boundary of a first trick play action identified during one of said analyzing steps to a boundary of a second trick play action identified during another one of said analyzing steps, the boundary of the first trick play action is extended to the boundary of the second trick play action when a change of video offset relative to a change of time between video offset events forming boundaries of the first and second trick play actions that are separated in time only by the spaced interval are consistent with the first trick play action and inconsistent with the second trick play action.

15. The computer-implemented method according to claim 10, wherein said merging step includes identifying an intermediate trick play action occurring between a first trick play action identified by said analyzing step of the first sequence of video offset events and a second trick play action identified by said analyzing step of the second sequence of video offset events, said intermediate trick play action is identified when a change of video offset relative to a change of time between adjacent boundaries of the first and second trick play actions separated in time only by the spaced interval are not consistent with that for either of the first and second trick play actions.

16. The computer-implemented method according to claim 10, wherein a new analyzing step is performed for each new sequence of video offset events received after a previous merging step, and wherein a new merging step is performed after each new analyzing step to further refine the reconstructed sequence of trick play actions.

17. A system for reconstructing trick play user activity, comprising:
   at least one processor configured to analyze playback information of a recorded program during a playback session to identify trick play actions occurring during the playback session, the playback information including a first sequence of separate video offset events, the separate video offset events being associated with different points of time during the playback session at spaced intervals;
   for each adjacent pair of video offset events separated by one of the spaced intervals, said at least one processor being configured to compare a change of video offset relative to a change of time to determine a type of trick play action occurring between the adjacent pair of video offset events;
   said at least one processor being configured to reconstruct a sequence of trick play actions occurring during the playback session from the trick play actions identified; and
   said at least one processor being configured to store the reconstructed sequence of trick play actions along with at least a subset of the playback information as stand-alone facts, said subset including individual video offset events unable to be incorporated into trick play actions.

18. A system according to claim 17, wherein, after the sequence of trick play actions have been reconstructed, said at least one processor being configured to analyze a second sequence of video offset events occurring at different points of time during the playback session, the second sequence of video offset events including video offset events at points of time different than that of the first sequence of video offset events, and wherein said at least one processor being configured to merge video offset information provided by the second set of video offset events with the sequence of trick play actions to generate a refined reconstructed sequence of trick play actions.

19. The system according to claim 18, wherein each of the spaced intervals between the different points of time corresponds to an equal and fixed amount of time, wherein the trick play actions identifiable by said analyzing step include play, pause, fast forward, and rewind actions, wherein each of the video offset events is provided in a form of a time-stamped video offset event including a timestamp value and a video offset value, and wherein said at least one processor being configured to identify a play trick play action between adjacent time-stamped video offset events sorted by timestamp value and separated only by the spaced interval provided that the change of video offset values is substantially equivalent to the change of timestamp values between the adjacent time-stamped video offset events.

20. A non-transitory computer-readable storage medium comprising stored instructions which, when executed by one or more computer processors, cause the one or more computer processors to perform steps of:
  analyzing playback information of a recorded program during a playback session to identify trick play actions occurring during the playback session, the playback information including a first sequence of separate video offset events, the separate video offset events being associated with different points of time during the playback session at spaced intervals;
  during said analyzing step, for each adjacent pair of video offset events separated by one of the spaced intervals, a change of video offset is compared relative to a change of time to determine a type of trick play action occurring between the adjacent pair of video offset events;
  reconstructing a sequence of trick play actions occurring during the playback session from the trick play actions identified; and
  storing the reconstructed sequence of trick play actions along with at least a subset of the playback information as standalone facts, said subset including individual video offset events unable to be incorporated into trick play actions during said analyzing step.

* * * * *